Aug. 6, 1968   J. C. WHITE   3,396,062
METHOD FOR MOLDING A COMPOSITE FOAMED ARTICLE
Filed July 27, 1964   2 Sheets-Sheet 1
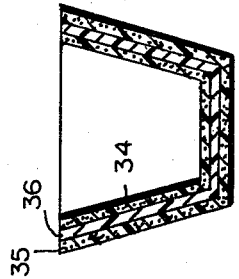
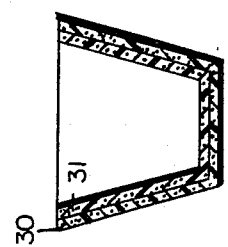
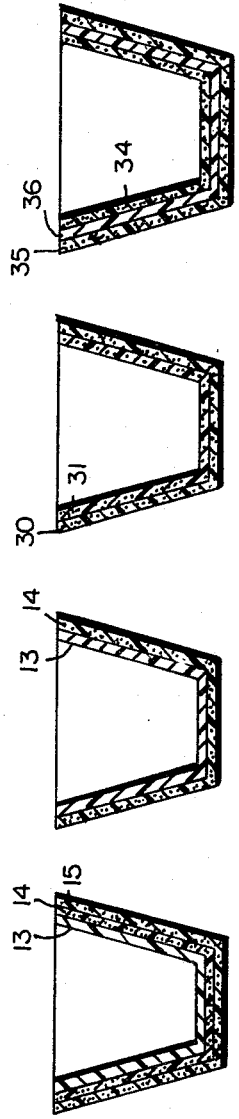
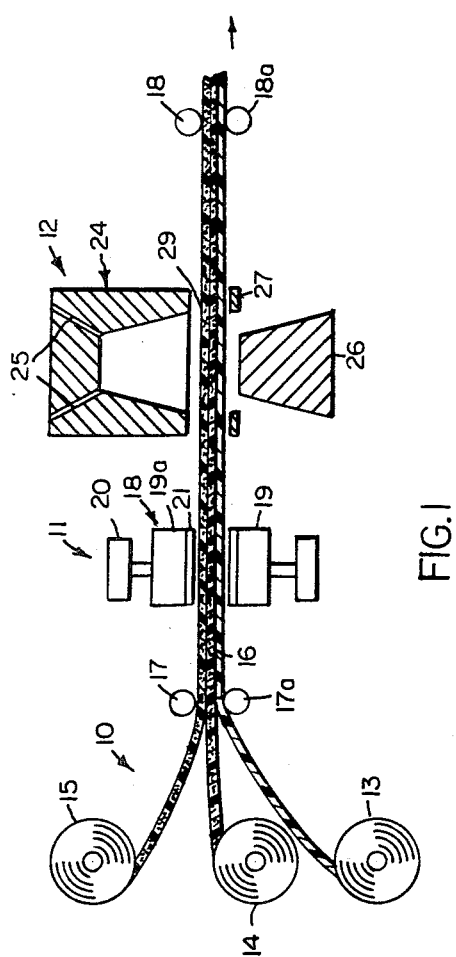
INVENTOR
JAMES C. WHITE
BY Wolf, Greenfield & Hieken
ATTORNEYS Aug. 6, 1968 J. C. WHITE 3,396,062
METHOD FOR MOLDING A COMPOSITE FOAMED ARTICLE
Filed July 27, 1964 2 Sheets-Sheet 2

INVENTOR
JAMES C. WHITE
BY,
Wolf, Greenfield & Hicken
ATTORNEYS

United States Patent Office 3,396,062
Patented Aug. 6, 1968

3,396,062
METHOD FOR MOLDING A COMPOSITE FOAMED ARTICLE
James C. White, Lynnfield, Mass., assignor to Sweetheart Plastics, Inc., Wilmington, Del., a corporation of Maryland
Filed July 27, 1964, Ser. No. 385,212
28 Claims. (Cl. 156—244)

ABSTRACT OF THE DISCLOSURE

A method of thermoforming foam plastic insulated articles is provided where at least one layer of a cellular foamed thermoplastic material is heated by contact heating and the heat of said contact heating is used in the thermoforming molding step. Preferably at least one sheet of foam plastic is used in combination with a solid thermoplastic liner and contact heating is used to derive the heat necessary for molding.

---

This invention relates to thermoforming and more particularly to thermoforming methods for fabricating insulated articles having at least one layer of a cellular foamed thermoplastic material.

The use of disposable plastic food and beverage containers has become widespread in recent years due at least in part to the rapid increase in the market for such products and to the inherent advantages of plastics as opposed to previously used paper products. However, problems have been encountered in economically manufacturing plastic containers such as cups for use in holding hot beverages. Thin walled cups often allow undesirable heat transfer to the hand of a user while thick walled cups are economically prohibitive. Thus, the art has turned to the consideration of cellular foamed thermoplastic materials for use in hot or cold container applications in an effort to insulate these containers.

Some cellular foamed cups now on the market are individually molded of foamable bead material. Such cups do have good insulating properties but suffer the disadvantages of relatively high manufacturing cost and relatively large stacking space requirements. Close stacking or nesting of such cups is difficult to achieve due to inherent wall thickness requirements of foamable bead molded cups. Thus, some thought has been given to the use of thin low density thermoplastic foamed sheets which can be formed by thermoforming techniques into cups and the like. Normally such sheets are not sufficiently self-supporting during molding. Thin foam sheets tend to tear or undergo cellular collapse after heating. Therefore, laminates of foamed sheet with solid or high density layers or sheets have been suggested.

When such laminated sheets are molded by conventional thermoforming techniques such as vacuum forming, problems often arise. In some cases, the foam sheet delaminates and/or blisters from the high density layers. Collapse of the cellular structure of the foam often occurs when using normal thermoforming techniques. Nonuniform thickness of foam layers in completed cups also occurs with relatively high frequency when using normal methods.

A further problem is encountered due to the relatively high cost of cellular foamed sheet materials, and the waste factor encountered in conventional single or plural station vacuum forming or other thermoforming methods. Thus, when a laminate comprising a high density liner and a cellular foamed sheet is passed into a multi-cavity vacuum thermoforming machine, only portions of the laminate corresponding with the cavities are formed into usable shapes. Areas between the formed shapes become waste material areas increasing the cost of each shape formed. Similarly, in single cavity molding waste areas of foam may extend beyond the cavity opening area.

It has now been found that the use of contact heating of a foam laminate to bring the laminate up to forming temperature is important in the fabrication of thin walled insulated foam laminate containers made by thermoforming methods. In addition, the use of preselected foam layer areas on a plastic backer or liner sheet considerably reduces over all cost in making thin walled containers comprising at least one layer of thermoplastic foam material.

It is an important object of this invention to provide a practical method of molding containers such as cups from a sandwich comprising a layer of low density cellular foamed thermoplastic material.

It is another object of this invention to provide a method in accordance with the preceding object which can be economically carried out with substantially conventional equipment to provide containers such as hot beverage cups which possess the necessary insulating properties so that they can be handled comfortably even when filled with beverages at temperatures as high as 212° F. This temperature is well above the normal 205° F. temperature of hot beverages served over the counter and 190° F. temperature of hot beverages dispensed from vending machines.

It is still another object of this invention to provide a highly economical method of forming plural layered cellular foam insulated containers.

Still another important object of this invention is to provide a method of molding inexpensive containers comprising plural layers of cellular foamed material which have been joined together.

According to the invention, a molded article such as a hot beverage container is formed from a sandwich comprising at least one layer of cellular foamed thermoplastic material on a liner or backer sheet. The sandwich has an upper surface and a lower surface. An area of the upper surface is engaged with a first contact heating means while substantially simultaneously engaging an area of the lower surface of the sandwich opposite the upper surface with a second contact heating means thereby confining a portion of the sandwich between the two heating means. The upper and lower surface areas are then heated by conduction to the forming temperature of the sandwich while it is confined, and the sandwich is subsequently thermoformed utilizing the heat derived from the above heating steps.

Thermoforming such as plug assist pressure molding can be used and the sandwich can comprise two or more layers of cellular foamed thermoplastic material and a thin sheet of comparatively high density or solid thermoplastic material compatible with the foamed layers.

It has been found that the use of two layers of cellular thermoplastic material provides slightly better insulating properties to the completed container as opposed to the use of a single cellular foamed layer having a thickness substantially equal to the combined thickness of the two layers previously mentioned.

Preferably a plurality of containers or cups are formed from a single sandwich using conventional pressure forming molding cavities distributed at spaced intervals over the sandwich as is known. The sandwich may comprise a single sheet of cellular foamed thermoplastic material and a high density liner or various combinations of plural cellular foamed sheets and plural liners. In some cases, the liner may be eliminated although the mechanical strength of unlined containers is reduced.

An improvement of the basic method of this invention comprises the use of a sandwich having a backer or liner which acts as a carrier sheet on which are positioned preformed layers in spaced defined areas comprising cellular foamed thermoplastic material with the defined areas and their spacing conforming and corresponding to orifice openings of a bank of spaced mold cavities aligned for molding of a plurality of articles from the sandwich. Similarly, when single cavities are used, the foamed thermoplastic areas on the liner preferably conform to the cavity opening size while the liner is greater in surface area than the cavity opening. The use of spaced areas can enable savings as high as 50% of over all cost of the relatively expensive cellular thermoplastic material.

The use of a carrier sheet and a foam layer sandwich provides advantages even when using single cavities or molds to form laminated articles.

These and other objects and features of this invention along with its incident advantages will be better understood and appreciated from the following detailed description read in connection with the accompanying drawings, in which:

FIG. 1 is a diagrammatic showing of an apparatus for carrying out a method of this invention;

FIGS. 2–5 are cross-sectional views through beverage cups made in accordance with the teachings of this invention;

Figure 6:
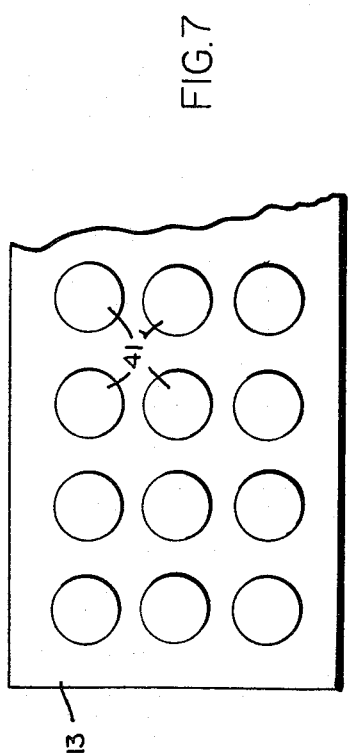
FIG. 6 is a top plan view of a sandwich for use in thermoforming of insulated containers.

Turning now to an embodiment of the method of this invention, FIG. 1 illustrates an aligned feeding zone 10, contact heating zone 11, and molding zone 12. Sheets of thermoplastic material to be laminated and/or molded in accordance with this invention are fed from the feeding zone 10 between an idler roller arrangement 17, 17a to form a sandwich 16 which passes through the heating zone 11 and is heated by conduction over upper and lower surfaces by contact heaters 18 and 19. The sandwich 16 is then passed into a plurality of conventional molds such as plug assist air pressure molds one of which is diagrammatically illustrated in the molding section 12 and molded into beverage cups.

The feeding zone 10 preferably contains a first roll 13 of solid thermoplastic sheet material which acts as a liner or backer. Rolls 14 and 15 preferably contain foamed cellular thermoplastic sheet material. Although two rolls 14 and 15 are shown for purposes of illustration, it should be understood that a single roll can be used in the same apparatus. Sheets taken from rolls 13, 14 and 15 are passed between idler rollers 17 and 17a, which are unheated and preferably position the sheets in a sandwich 16 without laminating the sheets one to another or substantially compressing the sheets. Preferably rollers 18 and 18a act as pull rollers to carry the sandwich through the processing zones at selected time intervals. In some cases rollers 17 and 17a may be power driven.

Heating is accomplished in the heating section 11 by means of an upper contact heater 18 and a lower contact heater 19. Each of the contact heaters 18 and 19 are preferably substantially identical and only heater 18 will be more fully described. Heater 18 preferably comprises a cylindrical piston head 18a having a lower circular surface thereof 21 coated with a release medium such as a thin layer of Teflon. The piston head is reciprocated into and out of engagement with an upper surface of the sandwich 16 by a stationary air cylinder 20 at selected time intervals simultaneously with contact of the lower contact heater 19 with a lower surface of the sandwich 16 opposed to the upper sandwich being contacted by heater 18. Thus, surface to surface contact is made with both upper and lower surface areas of the sandwich while the upper and lower piston heads apply a positive pressure to confine the sandwich therebetween thus preventing uneven expansion of the surfaces confined. Preferably sufficient heat and pressure is imparted to the sandwich to heat seal or laminate the layers to each other. It is also possible to carry out the actual heat sealing of the sandwich layers to form a laminate in the thermoforming mold 24 during the molding step without the need for additional heating. It is found that in some cases it is not necessary to heat seal the entire contacting surfaces of the layers, but spot sealing of portions of the contacting surfaces is sufficient to produce acceptable molded products.

Although only one contact heater pair is shown in FIG. 1, it should be understood that this invention contemplates the use of a bank of heaters arranged both longitudinally and transversely of the sandwich 16. Each of the heaters heats a surface area on the sandwich 16 corresponding to a mold cavity in the molding section. If the molding cycle is shorter than the heating time for a specific thermoplastic sandwich, it is possible to provide for multiple heating steps by arranging two or more contact heaters along the line of the elongated sandwich 16. Thus, heating can be accomplished partially by a first contact heater and completed by a second or subsequent contact heater with the intermittent regular step advancement of the sandwich 16 being limited only by the molding cycle time required for molding an article.

After passing through the heating zone 11, the sandwich 16 is drawn into the molding section 12 with each heated area being placed adjacent an opening of a molding cavity one of which is diagrammatically illustrated at 24. The preferred mold cavity 24 is a conventional air pressure molding cavity having suitable vents 25 and a plug assist 26. The heated area of the sandwich shown in FIG. 1 by the dotted portion 29 may expand slightly as it passes from the heating zone 11 to its position shown in FIG. 1 due to slight expansion of the foamed sheets.

At the mold cavity 24 the sandwich is clamped by a conventional clamping ring 27 and molded into the shape of the cup shown in FIG. 2 utilizing the heat imparted by the contact heaters. Suitable rim or flange forming devices (not shown) can be used to simultaneously form rims in the molded cups. Cups formed in molds such as 24 are removed by an air blow off, mechanical or other conventional means and the sandwich 16 is then advanced. As mentioned previously with regard to the heating zone, plural molding cavities are preferably positioned both transversely and longitudinally of the sandwich in positions corresponding to the positions of the heaters, to provide for plural cup formation from selected areas of the sandwich 16.

The thermoplastic materials used in the method of this invention preferably comprise polystyrene such as impact polystyrene. However, other known thermoplastic materials may be used including but not limited to vinyl polymers, acetates such as cellulose acetate and polyethylene. Preferably, both the solid carried sheet or liner 13 and the cellular foam thermoplastic sheets 14 and 15 are of the same thermoplastic material. However, in some cases different materials can be used for the different sheets or layers of the sandwich 16 formed by the method of this invention.

When polystyrene or impact polystyrenes are used in the method of this invention, it is preferred that the liner 13 have a thickness within the broad range of 5 to 25 mil and a range of 18 to 23 mil liner is found to be most suitable. The total foam layer thickness is preferably within the range of 10 to 120 mil with an optimum range of foam layer thickness of from 30 to 90 mil. While thicker materials may be used, this may defeat the purpose of obtaining a light weight, well insulated, deep draw, nestable cup or article. When articles other than polystyrene containing cups are to be formed the over all thickness of 145 mil can vary considerably. Similarly, if no liner is used and a foamed layer comprising one or more sheets of polystyrene is employed, the thickness of the foamed layer can vary considerably.

The heaters 18 and 19 preferably exert pressures of from 5 to 25 p.s.i. on the areas confined between them. Preferably the contact heater touching the lower surface of the sandwich 16 in contact with the solid thermoplastic is heated to a temperature of from 265° F. to 350° F. while the upper contact heater 18 adjacent the foam surface is heated to a temperature of from 320° F. to 375° F. In most cases it is found to be preferable to heat the foamed layer to a lesser degree than the solid thermoplastic layer. While the heater 18 is preferably heated to a higher temperature than heater 19 the foam layer itself is heated to a lesser extent than the solid layer due to the lower heat transmission properties of foam. Heat is preferably applied by the contact heaters for a period of from 2½ seconds to 12 seconds. Molding temperatures in the range of 260° F. to 300° F. are preferable.

Preferably the density of the polystyrene used in the foam sheets is in the range of from about 4 to 15 pounds per cubic foot and the density of the solid sheet is from about 20 pounds per cubic foot to about 65 pounds per cubic foot. When a single sheet of foam is used without a solid liner, its density is preferably in the range of from 15 to 30 pounds per cubic foot. Lower densities are normally preferred in order to obtain articles having low unit weights.

The heat applied by the contact heaters is preferably the heat used to form or mold the articles thus the spacing between the contact heating section and the molding section 12 is small. The molding cycle is preferably the same as the heating time although variations can be used since the contact heaters are reciprocal toward and away from the sheet and may be removed from the sandwich during portions of the molding cycle if desired.

While each of the ranges given above are preferred, it will be obvious that variations may be made depending upon the over all thickness of the sandwich or single foam layer, particular material being treated, and the density of the foam sheets. The ranges given are useful in forming insulated cups from polystyrene materials but will vary when forming other articles from other materials.

In a specific example of this invention, shown in FIG. 1, roll 13 is a sheet of Monsanto LL18 impact polystyrene material having a thickness of 0.010 inch and rolls 14 and 15 are each sheets of cellular foamed polystyrene each having a thickness of 0.45 inch and a density of 6.5 pounds. A total cycle time of 6 seconds is employed for both the heater section and the molding section. Each contact heater has a piston head with a thin Teflon coating and a lower surface area of approximately 18.5 square inches. A heater temperature of 350° F. is used for the upper heaters 18 contacting the foam and a temperature of 320° F. is used for the lower heaters 19. Six pairs of heaters ranged in two rows transversely of the sandwich are used with corresponding six molding cavities. Heater pressures of 18 pounds per square inch are exerted between each upper and lower piston head and the heated sandwich is advanced from the heating section to the molding section within 0.5 second of heating. Each molding cavity is a cup cavity for molding a 7 ounce cup having a height of 3 5/16 inches and a rim diameter of 2.9 inches. Each cavity is maintained at 85° F. A plug 26 and air pressure of 100 p.s.i. are used. Laminated cups shown in FIG. 2 are formed with a solid liner 13, and foam layers 14 and 15. These cups are uniformly produced with substantially even surface foam outside walls and with all layers substantially uniformly heat sealed together over their contacting surfaces. The resultant cups formed could be held in the hand of a user for over 180 seconds when filled with a liquid having a temperature of 170° F.

In a second specific example of this invention, the first example was repeated. However, rolls 14 and 15 were replaced with a single roll 14 of polystyrene insulation having a density of 7.5 pounds, and a thickness of approximately 0.45 inch. The insulating value of the molded cup obtained as shown in FIG. 3 was lower than that obtained in the molded cup of FIG. 2 as previously described. For example, when filled with water having a temperature of 170° F., such cups provided adequate insulation to the hand of the user for at least 65 seconds.

In a third specific example of this invention, the contact heating section 11 was replaced with radiant heaters spaced approximately six inches from the surfaces of the sandwich 16. All other conditions given in the first example were followed. The radiant heaters were sufficient to heat the upper surface of the sandwich 16 to 345° F. and the lower surface to 320° F. Resultant cups formed in accordance with this third example showed severe blistering of the insulation layer and extremely poor insulation making them undesirable for use as hot drink containers.

In alternate embodiments of the method of this invention, the number of foamed sheets and solid thermoplastic sheets are varied in the method described with respect to FIG. 1 to produce cups as shown in FIGS. 4 and 5. The cup shown in FIG. 4 is formed of two laminated layers of foamed thermoplastic material 30 and 31 without the use of a backer or liner such as 15. FIG. 5 illustrates the use of an inner foam layer 34, central foam layer 36 and outer layer 35 of a solid liner material.

In still another modification of this invention, the sandwich 16 may be laminated by the use of solvents and/or heat previous to entrance into the contact heating zone. While this is not necessary, it may be desired for ease of handling. Where desired, the sandwich 16 may be prelaminated in accordance with conventional methods. In some cases the lamination occurs in the mold 24 during the forming operation.

In some cases, both the foam sheets and the liner sheets or any one of them may be extruded directly from an extruder to the contact heating zone without first rolling these materials as shown.

Figure 7:
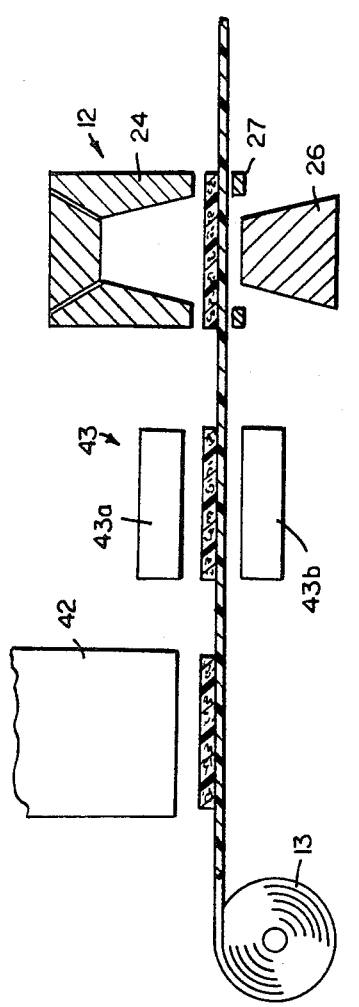
FIG. 7 is a diagrammatic showing of a method for forming cups from a sandwich as shown in the embodiment of FIG. 6.

Turning now to an improvement of the invention, and with particular reference to FIG. 6, a schematic representation of the invention is shown with a liner roll 13 of solid thermoplastic sheet material as previously described mounted for passage of the sheet through a foam applying zone 42, heating zone 43 and molding zone 12. In this embodiment, rather than applying the cellular foamed thermoplastic material in elongated sheet form as described in FIG. 1, the cellular foamed thermoplastic material is applied to the liner sheet 13 in the form of discs 41 by the use of any suitable disc discharge apparatus 42 or by hand. Each disc 41 has an outer configuration slightly greater than the opening of the mold cavity 24. As best shown in FIG. 7, a plurality of discs 41 are applied to the sheet 15 corresponding in number and position to the number and position of the molding cavities used and the heating means used if contact heaters are employed. Plural discs may be used to form a layer of plural thickness of foam as well as a liner of foam to provide various combination sandwiches and resulting cups as previously described.

The heaters 43a and 43b are preferably contact heaters as described with reference to contact heaters 18 and 19 of FIG. 1. However, cost saving advantages are obtained from the use of discs or predetermined areas of foam, even if radiant heating is used. Heating by radiant heat rather than conduction does result in certain problems as previously pointed out.

Molding zone 12 is a substantial duplicate of that described with reference to FIG. 1. The discs 41 are laminated either during the heating step or the molding step as previously described although they may be applied with a solvent or prelaminated to the liner 15 before reaching the heater. In some cases, it is possible to position the discs on the underside of the liner by the use of solvents or heat previous to molding so that a downwardly opening mold cavity can be employed. The specific times, temperatures, materials and sequence of operation described with respect to FIG. 1 is preferably employed in this embodiment of the invention.

As best shown in FIG. 7, since discs 41 cover substantially only those portions or areas of the liner 13 which are formed during the molding operation, a considerable reduction in the amount of cellular foamed thermoplastic material used is possible. Since the cellular foamed thermoplastic material is a relatively high cost raw material, overall costs may be considerably reduced.

Figure 8:
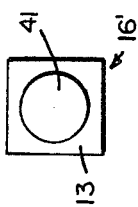
FIG. 8 is a top plan view of a sandwich for use in a single cavity molding method.

FIG. 8 illustrates a liner 13 made of a solid thermoplastic sheet having a rectangular outer configuration and a single disc 41 of cellular foamed thermoplastic material lying thereover. This arrangement can be used in a single cavity molding process. It is preferred that the area and outer configuration of the disc be less than the surface area and outer configuration of the liner to provide cost savings.

The disc 41 of FIG. 8 may be large enough to be clamped at its edges by a clamping ring such as 27 during molding. Alternatively, the disc 41 can have a surface area and outer configuration smaller than the inner diameter of the clamping ring or other clamping means and preferably substantially equal to the area and diameter of the mold cavity opening in which it is formed. In some cases the disc is of smaller diameter than the cavity opening. When the disc 41 is not clamped during molding it is necessarily attached to the liner 13 at least at certain spots such as near its outer edges, prior to molding. The edge attachment can be made by spot heat sealing or by the use of adhesives.

The method and conditions previously described with relation of FIG. 6 are preferably employed. However, since a single cavity is used, no continuous elongated sandwich need be employed and the sandwich 16' of FIG. 8 can be either jig or hand positioned between the heaters and in the mold 24.

Even if the disc 41 is not clamped during molding, the liner 13 is clamped and acts as a carrier for the disc during shaping. Cups such as shown in FIG. 3 can be formed economically in single cavity molds by the use of sandwich 16' of FIG. 8.

It should be understood that the disc 41 of FIG. 6 can have an outer diameter smaller than the clamping diameter of the clamping means 27 and conversely the disc 41 of sandwich 16' can have an outer diameter larger than the clamping diameter of clamping means 27. Thus, it is possible to clamp or retain both the liner and the foamed disc or to clamp or retain only the liner during the molding steps.

In some cases the solid liner 13 of FIG. 8 can be in the form of an elongated sheet with a plurality of discs 41 arranged thereon in an elongated line to permit continuous heating and subsequent feeding to a single molding cavity.

While specific embodiments of this invention have been shown and described, it will be obvious to those skilled in the art that many variations thereof are possible. For example, while thermoforming such as pressure molding is preferred for use in this invention, vacuum forming, air slip forming and match folding may also be employed.

The use of contact heating in a foam thermoforming process is an important step in the method of this invention. In its broadest aspect the invention contemplates conduction heating of a cellular foamed thermoplastic sheet to bring the sheet to its molding temperature. In addition, the use of discs or other configurations of foamed material conforming to slightly smaller or slightly larger than mold cavities used is also of great importance in reducing over all expense.

It is preferred to produce cups having foam outer layers and a solid inner liner to enhance printability, reduce inner wall staining, improve over all outer appearance and improve ease of rimming. However, it is also possible to reverse the order of the sheets shown in FIG. 1 to produce cups having an inner wall of foam and an outer solid thermoplastic wall.

While specific preferred times, temperatures, pressures and other parameters have been described particularly for use with deep draw insulated cups preferably formed from polystyrene materials, these parameters can vary greatly with other materials and when forming other molded articles.

From the foregoing description it will be appreciated that numerous modifications may be made of the invention without departing from the spirit of the invention. Because numerous modifications may be made of this invention, it is not intended to limit the breadth of this invention to the embodiments illustrated and described. Rather, it is intended that the breadth of this invention be determined by the appended claims and their equivalents.

What is claimed is:

1. A method of forming a molded article from a layer of foamed thermoplastic material having an upper surface and a lower surface,
    said method comprising,
        contacting an area of said upper surface with a first heating means while substantially simultaneously contacting an area of said lower surface opposite said upper surface with a second heating means whereby a portion of said layer is confined between said upper and lower heating means,
        heating said upper and lower surface areas to the forming temperature of said layer while said sheet is confined and subsequently removing said sheet from said upper and lower heating means and forming said foamed layer employing heat derived from said heating step.

2. A method in accordance with the method of claim 1 wherein said sheet is confined between said upper and lower heating means under pressure of 5 to 25 p.s.i.

3. A method in accordance with the method of claim 1 and further comprising expanding said foamed layer by said heat derived from heating step before said forming step.

4. A method of forming a molded article from a layer of foamed thermoplastic material in accordance with the method of claim 1 wherein said foamed thermoplastic material is moved along a path and contacted by said upper and lower heating means at a first position in said path,
    and said forming is carried out at a second position along said path.

5. A method of molding a composite sheet comprising a first layer of low density foamed thermoplastic material and an adjacent sheet of a thermoplastic liner,
    said composite sheet having an upper surface and a lower surface,
    said method comprising the steps of contacting an area of said upper surface with a first contact heating means while substantially simultaneously contacting an area of said lower surface opposite said upper surface with a second contact heating means whereby a portion of said composite sheet is confined between and in surface to surface contact with said upper and lower heating means,
    conduction heating said confined upper and lower surface areas to at least the molding temperature of said composite sheet and subsequently, removing said composite sheet from said upper and lower heating means and
    molding said composite sheet heated areas employing heat derived from said heating step.

6. A method in accordance with the method of claim 5 wherein a surface of said first layer is heated to a temperature of from 320° F. to 375° F. and a surface of said sheet is heated to a temperature of 265° F. to 350° F.

7. A method in accordance with the method of claim 5 wherein said layer and said sheet are laminated together prior to said contact heating step.

8. A method in accordance with the method of claim 5 wherein said temperature is maintained for a sufficient period of time to uniformly bond said first layer to said sheet without collapsing cells of said foam layer.

9. A method in accordance with the method of claim 6 wherein said foamed layer comprises
polystyrene foam having a density of from 4 to 15 pounds per cubic foot and a thickness of from 10 to 120 mils,
and said thermoplastic liner having a thickness of from 5 to 25 mils.

10. A method in accordance with claim 9 wherein said thermoplastic sheet comprises a solid thermoplastic sheet having a thickness of from 8 to 23 mils and said foamed layer having a thickness of from 30 to 90 mils.

11. A method in accordance with the method of claim 5 wherein said foamed layer has a density of from 4 to 15 pounds per cubic foot.

12. A method of forming thermoplastic articles comprising,
forming a sandwich comprising a first layer of foamed thermoplastic material, a second layer of foamed thermoplastic material and a sheet of a solid thermoplastic liner with said sandwich having a first outer surface provided by said first layer and a second outer surface provided by said solid thermoplastic liner,
contacting a selected area of said first surface with a first contact heating means and contacting a selected area of said second surface with a second contact heating means,
heating said first and second surfaces through said contact heating means to at least the molding temperature thereof, and subsequently,
thermoforming said selected areas utilizing heat derived from said heating of said first and second surfaces.

13. A method in accordance with claim 12 wherein said first surface is heated to a temperature within the range of from 320° F. to 375° F. and said second surface is heated to a temperature of from 265° F. to 320° F.

14. A method in accordance with the method of claim 13 wherein said foam layers have a combined thickness in the range of from 10 to 120 mils and said heating is carried out while confining said selected areas at a pressure in the range of from 5 to 25 p.s.i.

15. A method in accordance with the method of claim 13 wherein said sandwich areas are confined during said heating.

16. A method in accordance with the method of claim 15 wherein said foamed layers have a density within the range of from 4 to 15 pounds per cubic foot.

17. In a method of forming an insulating container from a composite sheet, the steps of forming said composite sheet with at least two adjacent layers of foamed thermoplastic material,
contact heating a plurality of distinct selected areas of said composite sheet to at least the molding temperature of said composite sheet while confining said areas and subsequently releasing said composite sheet and thermoforming said selected areas of said sheet into said insulated container utilizing the heat derived from said contact heating.

18. The method of claim 17 wherein said composite sheet further includes a solid thermoplastic liner and said composite sheet has a thickness no greater than 145 mils.

19. In a method of forming a thermoplastic article from a composite sheet comprising
at least one outer layer of a foamed thermoplastic material the improvement comprising substantially simultaneously contact heating opposing surfaces of said composite sheet to heat a selected area of said composite sheet to the molding temperature thereof while said selected area is confined and subsequently releasing said composite sheet and subsequently thermoforming said area into a thermoplastic article utilizing heat derived by said contact heating.

20. The improvement of claim 19 wherein said opposed surfaces are heated to different temperatures.

21. A method of economically producing foam laminated molded containers having a first foamed thermoplastic layer and a second thermoplastic layer,
said method comprising advancing an elongated sheet of said thermoplastic material toward a plurality of spaced thermoforming molding cavities, said cavities each defining predetermined cavity mouth dimensions,
forming a composite sheet by positioning a plurality of foamed thermoplastic shapes on spaced areas of said elongated sheets with said areas corresponding to spacing of said plurality of molding cavities,
said shapes each defining an outer perimeter closely conforming to the dimensions of corresponding molding cavity mouth dimensions,
heating said shapes and spaced areas to molding temperature and thermoforming said composite sheet at said spaced areas to produce said foam laminated containers.

22. A method in accordance with the method of claim 21 wherein said shapes comprise flat discs.

23. A method in accordance with the method of claim 22 wherein at least two of said shapes are positioned over each of said spaced areas.

24. A method in accordance with the method of claim 21 wherein said composite sheet is heated at said areas by conduction and said thermoforming is carried out utilizing said heating by conduction.

25. A method of economically producing a cellular foamed thermoplastic article comprising,
positioning a layer of cellular foamed thermoplastic material having a predetermined surface area over a sheet of thermoplastic material having a surface area larger than said predetermined surface area to form a composite sheet,
heating said layer and said sheet to the molding temperature of said composite sheet,
positioning said composite sheet in operative relationship with a molding cavity having an opening defining an area substantially corresponding to said predetermined area
and molding said composite sheet into said article utilizing heat derived from said heating step.

26. A method in accordance with the method of claim 25 wherein said sheet is clamped about said molding cavity opening during said molding,
and said layer and said sheet are joined to each other prior to said molding.

27. A method in accordance with claim 25 wherein said predetermined area of said layer is slightly greater than said cavity opening area and covers said cavity opening area,
and said sheet and an outer edge of said layer are both clamped about said molding cavity opening during said molding.

28. A method in accordance with the method of claim 25 wherein said heating is carried out by contact heating of said composite sheet over said predetermined surface area.

References Cited

UNITED STATES PATENTS

| | | | |
|---|---|---|---|
| 3,199,757 | 8/1965 | McConnell | 229—1.5 |
| 3,203,611 | 8/1965 | Anderson et al. | 229—1.5 |
| 3,237,834 | 3/1966 | Davis et al. | 229—1.5 |
| 2,120,328 | 6/1938 | Ferngren | 264—92 |
| 2,702,411 | 2/1955 | Winstead | 264—92 XR |
| 2,958,898 | 11/1960 | Voumard et al. | |
| 3,238,565 | 3/1966 | Jacobs | 18—19 |

(Other references on following page)

UNITED STATES PATENTS

| | | | |
|---|---|---|---|
| 1,752,402 | 4/1930 | Tomec et al. | 156—265 XR |
| 2,893,877 | 7/1950 | Nickolls | 264—48 XR |
| 2,979,246 | 4/1961 | Liebeskind | 264—45 XR |
| 3,039,911 | 6/1962 | Fox | 264—321 XR |
| 3,104,192 | 9/1963 | Hacklander | 264—321 XR |
| 3,126,139 | 3/1964 | Schechter | 265—45 XR |
| 3,137,747 | 6/1964 | Kline | 264—321 XR |
| 3,141,595 | 7/1964 | Edwards | 265—45 |
| 3,159,698 | 12/1964 | Suh et al. | 264—47 |
| 3,211,814 | 10/1965 | Kohrn et al. | 264—45 |
| 3,220,902 | 11/1965 | Edwards | 264—45 XR |
| 3,234,065 | 2/1966 | Best | 264—321 XR |
| 3,260,781 | 7/1966 | Lux et al. | 264—321 |

JAMES A. SEIDLECK, *Primary Examiner.*

PHILIP E. ANDERSON, *Assistant Examiner.*